(12) United States Patent
Tillotson, Jr.

(10) Patent No.: US 10,522,985 B2
(45) Date of Patent: Dec. 31, 2019

(54) CUSTOMIZABLE WIRE HARNESS FORM BOARD SUB-ASSEMBLY STRUCTURE HAVING SIMPLE, QUICK-CHANGE WIRE ROUTING EXCHANGE POINT CAPABILITY

(71) Applicant: John D Tillotson, Jr., Scottsdale, AZ (US)

(72) Inventor: John D Tillotson, Jr., Scottsdale, AZ (US)

( * ) Notice: Subject to any disclaimer, the term of this patent is extended or adjusted under 35 U.S.C. 154(b) by 0 days.

(21) Appl. No.: 16/532,327

(22) Filed: Aug. 5, 2019

(65) Prior Publication Data
US 2019/0363469 A1 Nov. 28, 2019

Related U.S. Application Data

(63) Continuation-in-part of application No. 16/133,466, filed on Sep. 17, 2018, now Pat. No. 10,374,400, which is a continuation-in-part of application No. 16/022,496, filed on Jun. 28, 2018.

(60) Provisional application No. 62/559,934, filed on Sep. 18, 2017, provisional application No. 62/532,352, filed on Jul. 13, 2017.

(51) Int. Cl.
| | |
|---|---|
| *H02G 1/00* | (2006.01) |
| *H01R 43/01* | (2006.01) |
| *G05B 19/418* | (2006.01) |
| *H02G 1/12* | (2006.01) |

(52) U.S. Cl.
CPC ......... *H02G 1/005* (2013.01); *G05B 19/4188* (2013.01); *H01R 43/01* (2013.01); *H02G 1/12* (2013.01); *G05B 2219/32051* (2013.01)

(58) Field of Classification Search
CPC ...... H02G 1/005; H02G 1/12; G05B 19/4188; G05B 2219/32051; H01R 43/01
See application file for complete search history.

(56) References Cited

U.S. PATENT DOCUMENTS

| | | | | |
|---|---|---|---|---|
| 3,653,411 | A * | 4/1972 | Mosher | H01B 13/01227 140/92.1 |
| 3,769,699 | A * | 11/1973 | Bennett | G11C 17/02 29/604 |
| 3,907,007 | A * | 9/1975 | Hobbs | H01B 13/01245 140/93 R |

(Continued)

FOREIGN PATENT DOCUMENTS

EP 0216464 A1 * 4/1987 ............ H01R 43/28

*Primary Examiner* — Michael C Zarroli (57) ABSTRACT

A floating pin form board assembly to aid wire harness assembly includes a first embodiment with a work block and chambers containing floating pegs which may reside in retracted or extended positions based on perforations in a wire routing form sheet which allow or prevent retracted pegs from rising to extended positions. Extended pegs may be locked into their extended positions by means of a slidable latch plate, and stop features in the pegs prevent them from escaping past their extended positions.

Alternatively, a floating peg form board assembly includes a perforated sheet and first, second, plates third plates each having apertures spaced apart in congruent arrays and a plurality of floating pegs having stop features, and a slidable latch plate having an array of keyhole slots complementary to apertures in one of the other perforated plates, with the latch plate used for locking the floating pegs into retracted or extended positions.

20 Claims, 9 Drawing Sheets

(56) References Cited

U.S. PATENT DOCUMENTS

| | | | | |
|---|---|---|---|---|
| 3,946,768 A | * | 3/1976 | Fiorentino | D03C 3/38 |
| | | | | 140/92.1 |
| 4,487,463 A | * | 12/1984 | Tillotson | H01R 12/58 |
| | | | | 439/345 |
| 4,512,620 A | * | 4/1985 | Tillotson | H01R 4/2429 |
| | | | | 439/391 |
| 4,979,544 A | * | 12/1990 | Swindlehurst | H01B 13/01227 |
| | | | | 140/92.1 |
| 5,799,391 A | * | 9/1998 | Tillotson | H01R 43/0488 |
| | | | | 29/753 |
| 5,878,788 A | * | 3/1999 | Gurry | B21F 1/002 |
| | | | | 140/71 R |
| 6,530,257 B2 | * | 3/2003 | Ooji | H01R 43/055 |
| | | | | 29/753 |
| 6,938,329 B2 | * | 9/2005 | Turek | H01R 43/01 |
| | | | | 29/33 M |
| 10,256,011 B2 | * | 4/2019 | Rouleau | H01B 13/01209 |

* cited by examiner

CUSTOMIZABLE WIRE HARNESS FORM BOARD SUB-ASSEMBLY STRUCTURE HAVING SIMPLE, QUICK-CHANGE WIRE ROUTING EXCHANGE POINT CAPABILITY

PRIORITY: CROSS-REFERENCES TO RELATED APPLICATIONS

This US non-provisional utility patent application is a continuation-in-part application of US non-provisional utility application Ser. No. 16/133,466, "Discrete Wire Harness Single Or Dual Operator Work Center," filed Sep. 17, 2018 and currently pending. That non-provisional utility application Ser. No. 16/133,466 claims the benefit of and priority to U.S. provisional application 62/559,934 "Discrete Wire Harness Single/Dual Operator Work Center," filed Sep. 18, 2017 and now expired.

US non-provisional utility application Ser. No. 16/133,466 is also a continuation in part of U.S. utility application Ser. No. 16/022,496 "Insulation Displacement Termination (IDT) For Mass Termination of Multiple Electrical Wire Gauge Sizes in Termination of Multiple Wire Gauge Sizes to Strip Terminal Products," filed Jun. 28, 2018 and currently pending.

This US non-provisional utility patent application also claims the benefit of and priority to Ser. No. 16/022,496 "Insulation Displacement Termination (IDT) For Mass Termination of Multiple Electrical Wire Gauge Sizes in Termination of Multiple Wire Gauge Sizes to Strip Terminal Products," filed Jun. 28, 2018 and currently pending.

U.S. utility patent Ser. No. 16/022,496 claims the benefit of and priority to U.S. provisional application 62/532,352 "Insulation Displacement Termination (IDT) Design for Mass Termination of Multiple Electrical Wire Gauge Sizes in IDT Multiple Position Electrical Connector Products," filed Jul. 13, 2017 and now expired.

This non-provisional utility patent application also claims the benefit of and priority to U.S. non-provisional application Ser. No. 16/516,672 "Insulation Displacement Termination (IDT) for Applying Multiple Electrical Wire Gauge Sizes Simultaneously or Individually to Electrical Connectors, Stamped and Formed Strip Terminal Products, and Assembly Fixtures Thereof," filed Jul. 19, 2019 and currently pending.

U.S. non-provisional application Ser. No. 16/516,672 also claims the benefit of and priority to US non-provisional utility patent application Ser. No. 16/022,496 currently pending, and US non-provisional utility patent application Ser. No. 16/133,466 also currently pending.

The entire contents of U.S. provisional application 62/532,352 "Insulation Displacement Termination (IDT) Design for Mass Termination of Multiple Electrical Wire Gauge Sizes in IDT Multiple Position Electrical Connector Products," filed Jul. 13, 2017 and U.S. Provisional Application 62/559,934 "Discrete Wire Harness Single/Dual Operator Work Center," filed Sep. 18, 2017 are hereby incorporated into this application document by reference.

The entire contents of US non-provisional utility application Ser. No. 16/022,496 "Insulation Displacement Termination (IDT) For Mass Termination of Multiple Electrical Wire Gauge Sizes in Termination of Multiple Wire Gauge Sizes to Strip Terminal Products," filed Jun. 28, 2018 and currently pending, and US non-provisional utility patent application Ser. No. 16/022,496 "Insulation Displacement Termination (IDT) For Mass Termination of Multiple Electrical Wire Gauge Sizes in Termination of Multiple Wire Gauge Sizes to Strip Terminal Products," filed Jun. 28, 2018 and currently pending, and U.S. non-provisional utility application Ser. No. 16/516,672 "Insulation Displacement Termination (IDT) for Applying Multiple Electrical Wire Gauge Sizes Simultaneously or Individually to Electrical Connectors, Stamped and Formed Strip Terminal Products, and Assembly Fixtures Thereof," filed Jul. 19, 2019 and currently pending are all hereby incorporated into this application document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention generally relates to wire harness assembly fixtures, tools, or aids used in a work center for manufacturing wire harness assemblies commonly comprised of multiple wire gauge sizes pulled from bulk storage spools or containers and assembled into completed wire harness configurations optionally including crimped terminals inserted into various cable end insulator housings and also optionally including wire end terminals such as crimped-on lugs.

BACKGROUND OF THE INVENTION

Manufacturers of discrete wire harness assemblies must usually arrange to provide an extensive inventory of components that require high labor content to assemble in order to produce acceptable finished products to their OEM customers. Labor-intensive tasks commonly include selecting and handling correct wires types and sizes, and selecting from a myriad of loose piece components such as connector housings, hardware, clips, terminals, all of from among large numbers of bulk supplies. Other tasks include pulling wire and routing groups of wires around pegs and other such layout fixtures to establish proper lengths for each wire of a product being manufactured, inserting wires into terminal and jacket crimping and forming machines, and snapping or inserting terminated wires into proper cavities of cable end connector housings, or arranging groups of wires cables onto insulation-displacement devices and mass-terminating these groups using an arbor press or some other high-force machine.

Often assembly fixtures are fitted to move on conveyor systems, and a work shift can include several different products to be made within the same work cell. Changeovers from one product to the next often require that fixtures such as for wire cutting or stripping, or for supplying and crimping terminals onto wire ends must be re-adjusted or re-configured. Peg fixtures for dressing wires to length must also be re-configured or removed from a work cell and replaced with fixtures configured for the next cable product to be manufactured.

Thus cable assembly work entails much dexterity, attention to details, fine finger work, and the ability to follow complex assembly and testing instructions, and to react correctly as these instructions are changed to follow various and flexible production schedules. Wire harness manufacturing entails an intense amount of complex and detailed work, all of which must be executed competently and correctly.

Thus opportunities exist and will continue to exist for reducing labor costs by simplifying tasks, providing machines that can execute sets of similar functions simultaneously, and machinery of fixtures which are easy to re-configure so that flexible manufacturing work cells may convert from one setup to the next with less time, less effort, and while minimizing the opportunity for manufacturing errors.

BRIEF SUMMARY OF THE INVENTION

From the aforementioned background it is understood that many objectives exist. A primary objective of the invention is to arrange and provide a configurable fixture for use within a work station to assist with discrete assembly tasks such as grouping wires together to form a wire harness assembly, fixing the wires to their proper lengths and cutting the wire to their proper lengths. Other tasks it is desired to assist include making arranging groups of wires for termination of wires and insertion of terminated wires into cable end insulator housings, which include both individual wire termination tasks and mass termination tasks which generally involve a single task effecting an assembly operation onto groups of more than one wire simultaneously.

Since the largest portion of the expense in producing a wire harness assembly is in the management of so many different wires and leads, another objective of the invention is to reduce a unit cost of the harness produced in the work station by enabling mass terminations or in-gang assemblies of similar or sufficiently identical components so that a single action of an application-specific machine or tool can correctly and completely execute a plurality of similar or identical assembly steps in several closely collected locations.

A corollary objective of the invention is to enable increased flexibility in routing and placement of pluralities wire sub-assemblies, and another corollary objective of the invention includes production and productivity improvements to wire harness assembly lines which ordinarily use pegboards or form boards or other fixtures for workers to dress sets of wires to establish their proper finished lengths.

Another objective of the invention is to reduce "in-process inventory movement," which includes the time expended to lay one or more wires into a wire harness assembly fixture so that the wires lengths may be determined and the wires may then be cut to their proper lengths efficiently. Reductions of "in-process inventory" for wires or other components in motion directly reduce the unit cost of a finished wire assembly, because then burden rate or overhead costs of operating an assembly work cell also include the required labor to maintain the facilities and the handling of in-process inventories. It is therefore another objective of the invention to arrange all necessary assembly infrastructure in a smaller space and volume than current methodologies typically require and consume.

From the foregoing, there is also seen a need for streamlining the process for changing over a set-up for making one assembly to a configuration for making a different assembly. Universal tooling may then effect substantial cost savings over current manufacturing operations. Various devices are currently available which attempt to address these challenges, although they may at best meet only one or two aspects of the totality of the requirements.

BRIEF DESCRIPTION OF THE DRAWINGS

A further understanding of the nature and advantages of particular embodiments may be realized by reference to the remaining portions of the specification and the drawings. Similar reference numerals are used to refer to similar components.

DETAILED DESCRIPTION OF THE INVENTION

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this specification, the term "means for . . . " as used herein including the claims, is to be interpreted according to 35 USC 112 paragraph 6.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Also in this specification the word "wire" may be used interchangeably with the word "cable" when meaning a single strand structure comprising a solid or a stranded central conductor surrounded by an insulating coating or a jacket. A "wire" in this specification may have a solid central conductor or a braided or served strand built up from a plurality of solid conductors. Some wires have a built-up core of multiple conductors, with each individually coated a solder or a brazing material which is heated to bond the group to act as a unitary conductor. "Ribbon cable" is comprised of a linear array of individual wires having conjoined insulators to form a flat membrane or strip. Also in this specification, where the word "terminal" or its plural is used without any other adjacent word defining or limiting the scope or type of terminal, then the word applies to all types of terminals and all manners of bulk supplies of these terminals, such as side feed, end feed, and loose piece terminals.

During cable and wire harness assembly, fixtures are often used for assembling wire harnesses for nearly any industry, the devices and their arrangements as disclosed in this document may offer some of their greatest benefits and improvements to wire harness assembly in the automotive industry. Wire and lead production can proceed at a rate of more than 3,000 wires or leads per hour, and may include tasks such as handling wires of different gauges, different lengths, different colors, or having different terminals crimped to them, and other variations in accordance with customer requirements. A significant amount time is consumed in handling wires from the time they are produced to the time they are assembled on the harness boards and finally packaged and shipped. The time defined by movement of one cut wire length from one place to another is referred to as "in-process inventory movement" of wires or leads. Inventory retained for a long period of time has an inherent cost where return on investment is affected. By reducing in-process inventory time in the manufacturing cycle, the end cost of a completed wire assembly may also be effectively reduced.

According to the invention, wire routing form board sheets are thin, pliable films or sheets having pre-punched holes or apertures replace wire dressing form boards used in conventional wire harness manufacturing. In currently conventional practice, rigid boards with permanently mounted pins are retrieved from storage, and delivered and located in a workspace, then struck and put away as part of a production change-over. During assembly, cable end connectors or modules to which wires will be terminated are positioned on the form board at designated positions, and then wires are laid along paths defined by the locations of the wire-end components and the pins or pegs as they are wound around these. Each act or series of acts of laying a wire from a start location to an end location determines the overall length of that wire. If a plurality of wires all start and end together, they may be acquired as a group and routed along a path on the form board as a group. This act may be referred to as a 'multiple wire pull.' Wires may be terminated to cable end connector housings by many means as discussed in the parent application. Wires may be terminated to contacts which are then inserted into connector housings, or connector assemblies may be furnished with partially or fully installed contact terminals so that wires are mechanically and electrically engaged onto them. Tools and fixtures may be utilized to make these connections individually or in groups, which is called a "mass termination." Multiple wire pulls combined with mass terminations and the routing of pluralities of wires simultaneously around the pegs of the inventive form board assembly enable substantial improvements in assembly productivity and may substantially reduce wire harness production and product costs.

For rectangular form boards with permanently mounted pegs, the boards may be stored in frames or stacks in pairs with the pegs facing each other. The storage volume consumed by configurations for two distinct products comprises the two orthogonal linear dimensions of the rectangle, times the sum of twice the thickness of the form board plus the height of the pins extending above the work surface of the form board. The storage volume for form boards for 100 distinct products would be 50 times the volume for two products.

However, using the inventive floating pin form board assembly and its wire routing form sheets, the total volume taken up by the assembly tool and sheets for 100 distinct products comprises the two orthogonal linear dimensions of a rectangle containing the floating pin form board assembly, times the thickness of the form board assembly, plus the volume containing 100 wire routing form sheets. Since a wire routing form sheet is a thin membrane such as a perforated mylar sheet of less than 0.015 inches thick, the storage volume of 100 distinct products adds less than 2 inches of thickness added to the required volume for storage of the physical assembly aids for all of those different products.

For an operation handling hundreds of designs, the improvement in storage density of sets of perforated sheets in accordance with the invention as compared to stacked-up pegboards is substantial, and the labor costs of set-up saved by automatic pop-through pegs versus other manual means of installation and removal are a second substantial cost reduction which directly contributes to reduced unit cost per product assembled in a work cell in accordance with the invention. Also, typical form boards not in accordance with the invention may include permanently mounted pegs or threaded sites where pegs are attached in preparation for use. Both of these current practices lack the compact and convenient storage utility of the perforated sheet materials in accordance with the invention, because boards with permanently installed pegs can only be stacked as closely as the protrusion height of the pegs allow, and boards with peg installation sites consume laborer's time for installing and removing pegs as production is changed over from one product to the next. Thus the savings in storage volume for flexible assembly tooling for the range of products able to be produced in a work cell using the inventive form board is substantial and beneficially contributes to lower overhead costs which directly decreases per part production costs as well.

Wire routing form sheets may be stored in the work cell in cabinetry or shelving or other organized filing means. Because wire routing form sheets in accordance with the invention are sheets of light and easily handled materials, they are a superior improvement over conventional form boards which are commonly made of thicker, bulkier, and heavier materials such as perforated Masonite, plywood, or thick plastic or metal plates. This improvement may also enable greater workforce diversity by allowing the hiring of persons having modest upper body strength, which is a wider possible applicant pool than the set of persons capable of manipulating bulky and heavy boards.

Using the inventive floating pin form board, all wires may be assembled onto a specifically selected perforated wire routing that flexibly admits extendable pegs through its apertures. The locations and configurations of the pegs act like assembly fixtures and help workers to accurately dress and assemble wires of a harness product being produced. The features and advantages of inventive wire routings of the invention are described in detail below. The abbreviation "IDT" for "insulation displacement termination" is often used interchangeably with the abbreviation "IDC" which can stand for "insulation displacement crimp." Also, in this specification, the phrases "floating pin" and "floating peg" and their plurals are used interchangeably and with the same meanings. Thus a "floating peg form board assembly" is equivalent to a floating pin form board assembly."

Figure 1A:
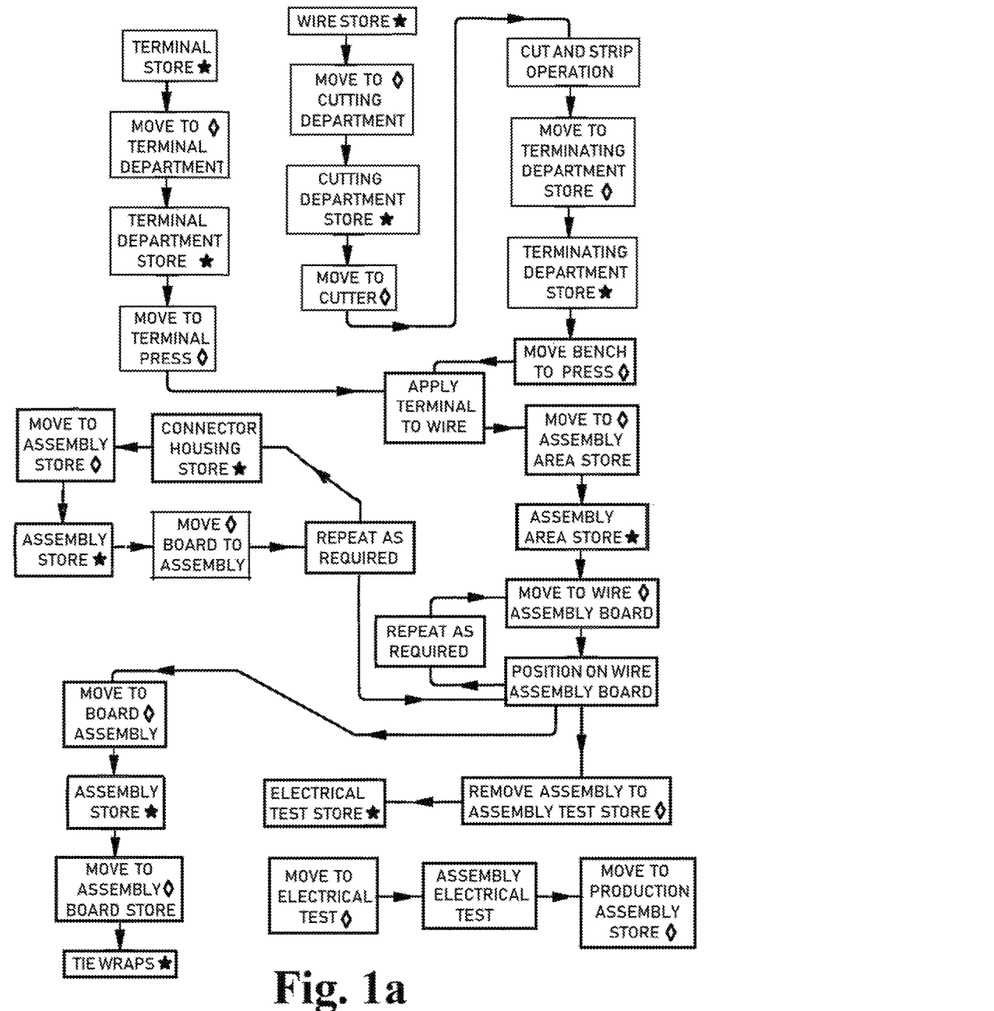
FIG. 1a shows a flow chart of steps of a typical wire harness assembly operation as described in the parent application.
Figure 1B:
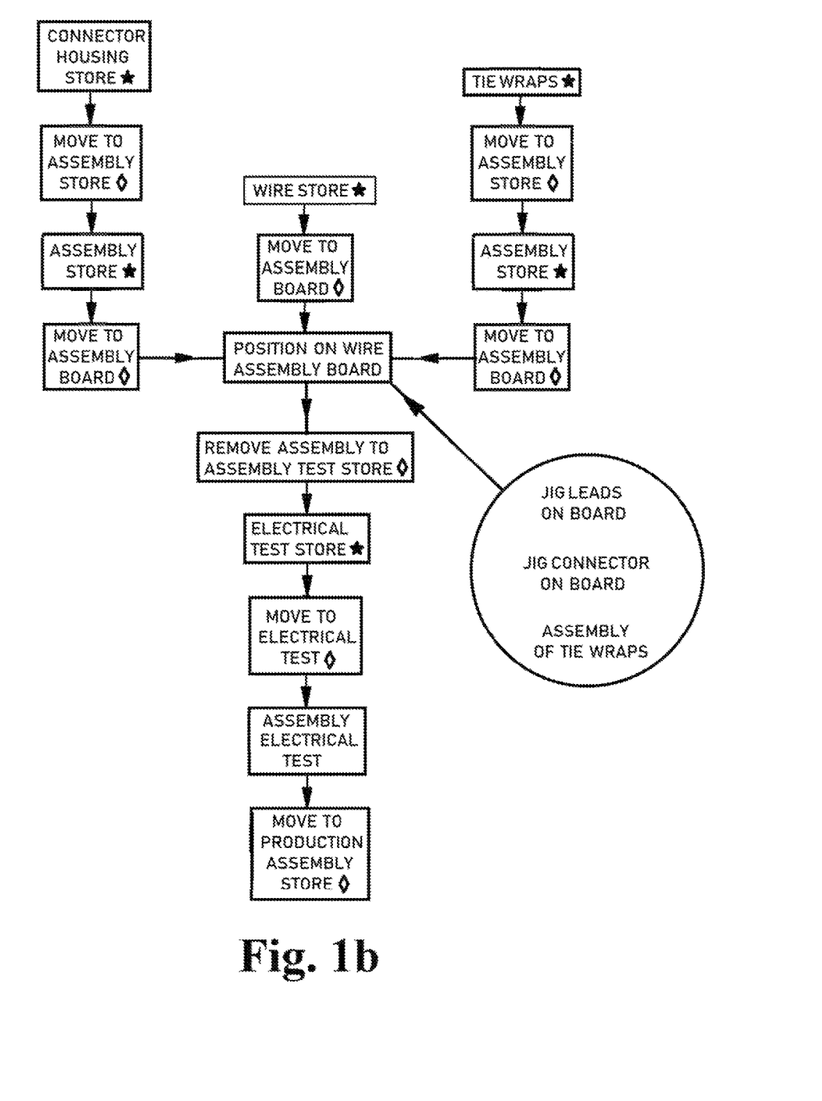
FIG. 1b shows a flow chart of the same wire assembly in FIG. 1a that is manufactured according to an embodiment of the parent invention, except that this flow incorporates inventive process steps enabled by the invention.

FIG. 1a shows a flow chart of all the steps of a typical wire harness assembly operation lacking the improvements afforded by the parent invention. FIG. 1b shows a flow chart of the same wire assembly in FIG. 1a that is manufactured according to an embodiment of the parent invention, except that this flow incorporates inventive process steps enabled by the invention. Blocks which include a star (★) denote stations where items are considered to be in inventory. Blocks which include a diamond symbol (◊) denote material in motion and in-process inventory. As described in the parent specification, in comparing the conventional process of FIG. 1a to the improved process of FIG. 1b, it is seen that the conventional process includes 15 in-process inventory moves while an improved and simplified process in accordance with the invention includes only 8 in process inventory moves, which represents a reduction of around 47%.

Figure 2A:
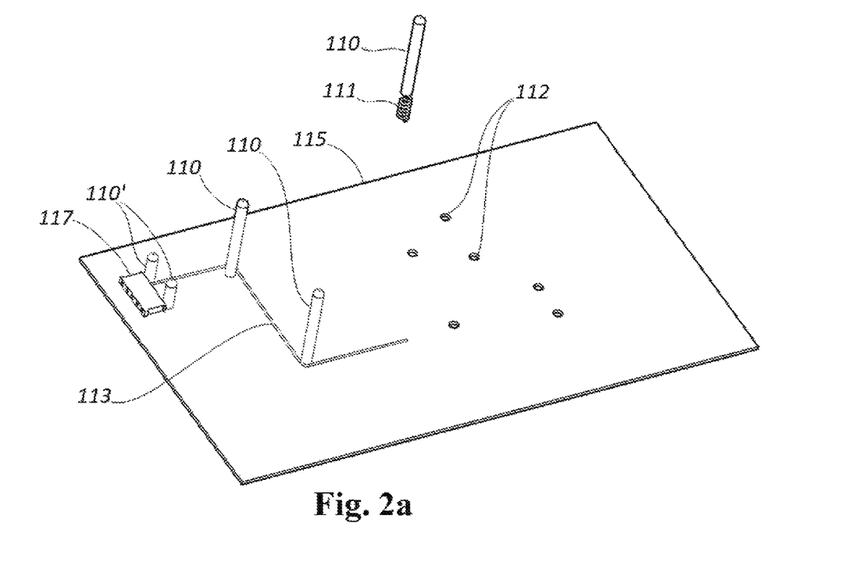
FIG. 2a shows an embodiment of a wire routing form sheet in accordance with the invention.

FIG. 2a shows an embodiment of a wire routing form sheet [115] in accordance with the invention. Wire routing form sheets may be made preferably of mylar or of other translucent, clear, or opaque sheet materials selected to endure industrial use. Mylar® is a brand name for a special type of stretched polyester film. Melinex and Hostaphan are two other well-known trade names for this plastic, which is more generally known as BoPET or biaxially-oriented polyethylene terephthalate. In this specification, "mylar" is used as a generic term for BoPET, and also to e encompass any other material suitable for use as a durable and flexible membrane, including but not limited to acrylonitrile butadiene styrene (ABS,) or polyethylene (PE.) Thus a "perforated wire routing form sheet" may also be referred to as a "perforated flexible wire routing membrane." Besides flexible wire routing sheets, firm or rigid planes of material may also be perforated to produce wire routing form sheets. Thus, sheet metals such as aluminum or various steels mat be used, and also wood, and more rigid plastic materials such as polystyrene or polyamide (PA, or 'nylon') or Masonite® may also be used to produce wire routing form sheets.

Figure 2B:
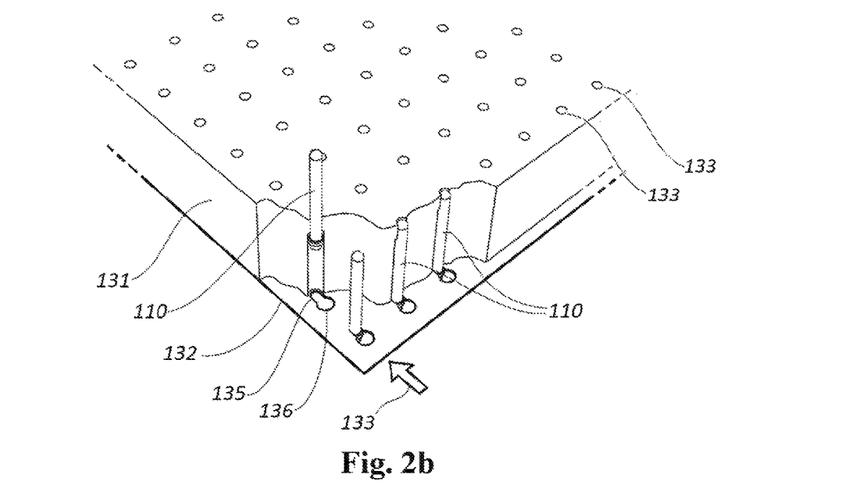
FIG. 2b shows a portion of a wire routing form sheet work block assembly in accordance with the invention.

A form board assembly in accordance with the invention has a standardized array of pegs [110] retracted and latched in chambers to at or below its work surface. Each peg may be supported from below by a compressed spring [111] beneath it, so that when latches are released the pegs will be free to rise above the work surface unless otherwise impeded. Further details of an embodiment of a latch and release mechanism are illustrated in FIG. 2b.

The wire routing form sheets include holes [112] at selected locations so that pegs aligned with the holes pop up through them and are available for use as positioning aids and wire routing aids. Other pegs in the work block which are not aligned with any holes remain trapped beneath the wire routing form sheet. The pegs may be of various lengths or they may include stepped diameters so that different sized holes in the wire routing form sheet allow the pegs to pop up or "float" to different heights depending on their mode of assisting in assembly of a wire harness.

In this figure as an example, a connector housing [117] (also called a headshell) is positioned to abut two shorter alignment pegs [110'] which may also be stepped pegs caught at a lower extension height as described. Other pegs arise to their full height through holes in the wire routing form sheet. A strand of wire [113] is shown inserted into the connector head shell (with either a snap-in terminal having been applied to the end of the wire, or the wire being received into an IDT contact within the connector,) and as shown the wire is lead around two of a plurality of pegs. In practice the other end of the wire may be terminated with a lug if left loose or as a "flying lead," or it may be routed and wound around other raised pegs to be installed into another connector by means of a crimp terminal or an IDT single terminal, or into an IDT connector, or pre-set (that is, positioned in advance) for mass termination of a set of wires which may include more than one wire size within the set. In such a configuration it is advantageous that, if possible, the terminals used in such a cable assembly are capable of effectively terminating to wide ranges of wire sizes so that the number of terminal types or sizes may be minimized within the entire assembly.

Wire routing form sheets in accordance with the invention may also include graphic markings to assist workers in positioning components and routing wires, and may also include identifying texts, other identifying indicia, and bar codes, grid codes, or QR codes for identification of the sheet and its associated product by machine vision.

As described previously, the improvement in storage density of sets of perforated sheets in accordance with the invention as compared to stacked-up pegboards is substantial, and the labor costs of set-up saved by automatic pop-through pegs versus other manual means of installation and removal are a second substantial cost reduction which directly contributes to reduced unit cost per product assembled in a work cell in accordance with the invention.

FIG. 2b shows a portion of a wire routing form sheet assembly aid in accordance with the invention which includes a work block [131] and a plurality of extendable and retractable pegs [110] which can be driven upwards from below by peg lifting means such as a spring, pneumatic pressure, magnets, or solenoids. The work block has a thickness according to this embodiment preferably at least as thick as the excursion distance of the pegs, which may be defined as the distance from a rest position wherein the pegs are fully retracted within the work block to an extended position wherein defined by the stop feature abutting the end surface of the counterbore of the chamber within which it is disposed. The pegs are disposed within an array of chambers [133] and have a rounded tip, a shaft portion having a first diameter, and a stop feature or attached component near the bottom end opposite the tip, and this stop feature or component has an outer diameter greater than the first diameter of the shaft portion of the peg.

In a mechanical embodiment within the scope of the invention, beneath the thickness of the work block is a slidable latch plate [132] which includes an array of keyhole slots complementary to the array of chambers in the work block. A keyhole slot is an aperture having a perimeter comprising an arcuate portion of a first diameter [135] slightly larger than the first diameter of the peg, and an arcuate portion of a second diameter [136] larger than the diametral extent of a stop feature of a peg. The plurality of floating pegs are arranged in an array and retained in a retracted position while the keyhole slots in the latch plate are positioned such that the larger diameter stop features or components of the array of pegs are all trapped beneath the smaller diameter portion of the keyhole slots.

When the latch plate slides in a direction indicated by arrow [133] the larger diameter portions of the keyhole slots slide into concentricity with the pegs, releasing each peg to rise to its extended position. In this figure the lifting spring [111 of FIG. 2a] is omitted. As stated elsewhere, peg lifting means such as air pressure, magnets, or solenoids may also be used to apply a lifting force to a peg which by virtue of being aligned with a hole [112] in a wire routing form sheet, is free to rise into its extended position.

Figure 2C:
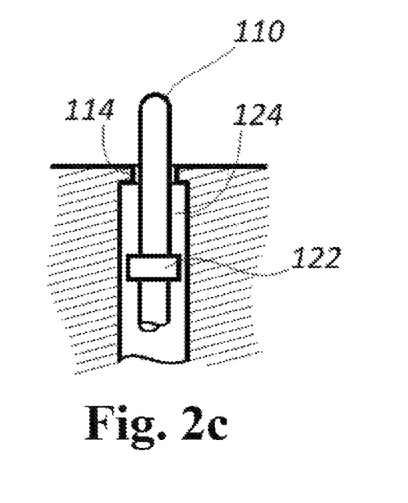
FIG. 2c shows a cross section of a chamber and peg in accordance with an embodiment of the invention.

FIG. 2c shows a cross section of a chamber and peg in accordance with an embodiment of the invention. Each chamber has a first through-diameter [114] and a counterbore with a second counterbore diameter [124] larger than the first diameter. In this embodiment the peg [110] has a first diameter for its shaft portion which is slightly smaller than the through-diameter of its chamber in the work block. The peg also includes a stop feature or bead [122] having a diameter larger than the through-diameter which is sized to slide within the chamber counterbore, or the peg may include some other the stop feature also receivable within said counterbore, such as a transverse pin or a flange having any sort of diametral extents larger than the diameter. A diametral extent in this specification is a width dimension of a radially protruding feature taken symmetrically from the central axis of the shaft portion of the peg. For non-symmetrical stop features such as a transverse pin or a stud protruding from only one side of the peg, the diametral extent is figured to be twice the radial extension of such a protrusion from the central axis of the shaft portion of the peg.

Figure 2D:
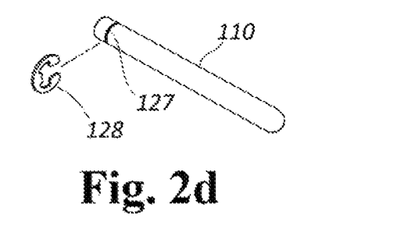
FIG. 2d shows an alternate embodiment of a peg assembly in accordance with the invention.

The peg, when impelled from below by peg lifting means, will rise to an extended position defined by the stop feature abutting the end surface of the counterbore of the chamber within which it is disposed. According to an alternate embodiment of a peg assembly shown in FIG. 2d, the peg [110] has a groove [127] turned near its bottom which accepts a snap ring [128] of a larger external diameter which is selected to slide within a chamber and is larger than the through diameter so it will act as a stop once the peg has reached its extended position. Alternatively, a peg may have a transverse pin or stud or similar feature extending radially beyond the first through-diameter of the chambers the wire routing form sheet work block within which it resides.

Figure 2E:
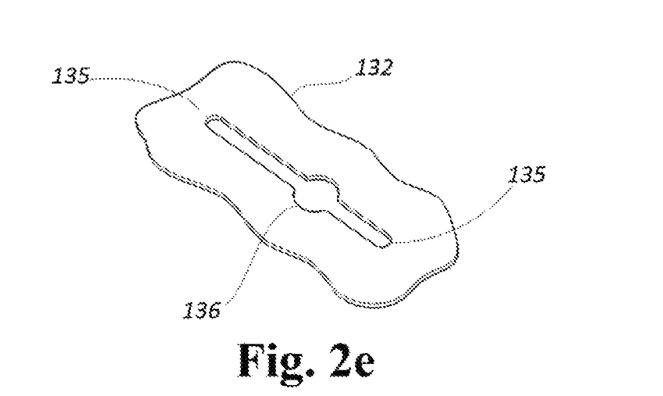
FIG. 2e shows an alternative embodiment of a slot for a sliding latch plate in accordance with the invention.

FIG. 2e shows an alternative embodiment of a slot for a sliding latch plate [132] in accordance with the invention. In this embodiment a slot is elongated so as to pass through both sides of a central round aperture section, and terminates with rounded ends of a first diameter [135] slightly larger than the first diameter of the pegs. The diameter of the central aperture is a second diameter [136] slightly larger than the stop feature or component at the bottom end of the peg.

Figure 2F:
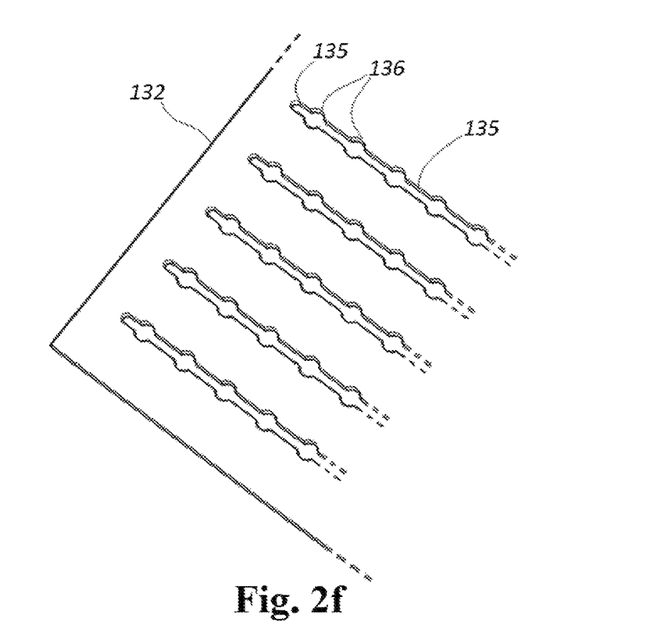
FIG. 2f shows an alternative embodiment of a latch plate in accordance with the invention.

FIG. 2f shows an alternative embodiment of a latch plate [132] in accordance with the invention. This version of a latch plate has a two-dimensional array of apertures having the second larger diameter [136] being connected along one array axis by long slots having widths equal to the first smaller diameter [135] and extending along said array axis past the first and last of the larger apertures of each row or column in that axial direction. When in use with the larger diameter sections registered to the chambers of the work block, the slots in this embodiment of a latch plate traverse at least two chambers, and may preferably traverse an entire row or column of chambers.

FIGS. 3a through 3d describe the operation of a stacked series of perforated boards and pegs as used in a floating pin form board assembly. In the description of this assembly and its operation, the word "pin" means substantially the same type of slender and typically cylindrical component referred to elsewhere in this specification using the word "peg." Also, the embodiments of FIGS. 2a through 2f and 3a through 3e have different features and components for defining an extended pin position and a retracted pin position, within which each floating pin may be individually locked in a position.

A floating pin form board assembly in accordance with the invention comprises a stack of pegboards each having holes spaced on a two-dimensional array. Although the aperture diameters of each pegboard may vary, the set of pegboards are held in a frame so that the centers of all arrays of apertures are aligned. In FIGS. 3a through 3d the vertical spacing between the pegboards and the lengths of the pegs or pins are exaggerated so that the operations of the system can be illustrated more clearly.

The universal wire harness board, situated on the work bench or incorporated into it, comprises a floating pin form board assembly, with mylar sheets that include aperture locations for routing wires according to wire harness design specifications. The universal wire harness board, or universal wire form board assembly, may include a plurality of floating pins arranged in an array.

Figure 3A:
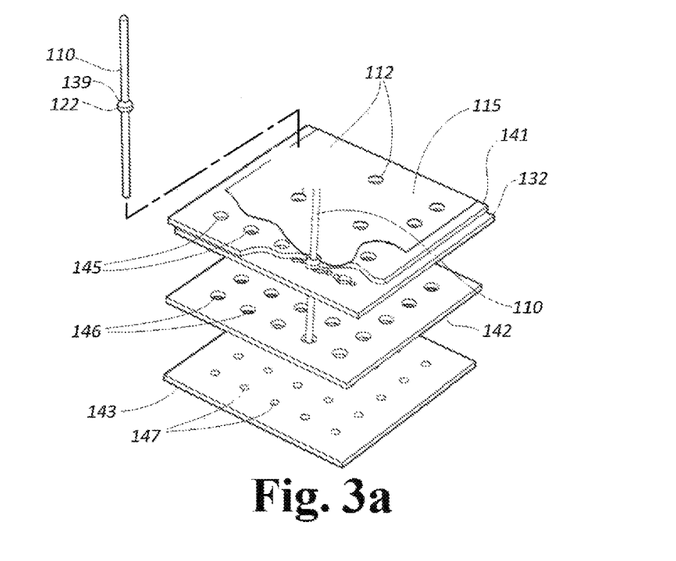
FIG. 3a shows a wire routing form sheet, a stack of pegboards, pegs, and a latch plate as used in a floating pin form board assembly in accordance with the invention.

FIG. 3a shows a wire routing form sheet, a stack of pegboards, pegs, and a latch plate as used in a floating pin form board assembly in accordance with the invention. The wire routing form sheet [115] is a flexible membrane that includes pre-punched holes [112.] This sheet is used in place of typical wire dressing form boards used in conventional wire harness manufacturing. Because mylar sheets are much thinner and much lighter than either the Masonite or plywood sheets of typical form boards, they may be stored much more densely such as in cabinets designed for large-format printed sheet articles such as maps or large mechanical drawings or blueprints. Cost savings and advantages include a substantial reduction in storage space, reduced set up time to start an assembly process, and that the duplication of sheets for larger order requirements can also be completed using less time and at reduced material costs. Compared with stacked storage of form boards having permanently mounted pegs which must be spaced apart by at least the thickness of the board plus the protruding length of the pegs mounted thereupon, a stack of mylar sheets may be stored in flat-drawer furniture at a storage density improvement of hundreds if not thousands of sheet documents for every one typical form board stored in conventional shelving.

A floating peg [110] in accordance with the invention has a first diameter over a portion of its length which is typically most of its length, and a toroidal or cylindrical feature called a stop feature or a bead [122] having a second diameter positioned somewhere along its length which is a larger diameter than the first diameter. The claimed stop feature is also equivalently called a "bead" throughout most of this specification, although it may also be fashioned as a snap ring or a washer secured to the shaft of a peg or pin. The feature may be an integral part of the peg or it may be a discrete component affixed to it such as the snap ring of FIG. 2d. Because making a floating peg by lathe turning a large diameter stock to reveal a bead feature of the second larger diameter and turning the peg down to its first smaller diameter over the rest of its length would create a lot of waste material in the form of lathe chips, it may be preferable to secure rods of the first diameter and affix beads made from separate stock. The bead may have a chamfer [139] or one or more fillets to ease its motions during the setup and take-down phases of a form board.

Pegboards are available in a number of standard array spacings, and 1-inch and 2-inch spacings are readily available in the USA. Pegboard is also called perforated hardboard, and in this specification "pegboard" means any sheet material of plastic, metal, or plywood, or similar sheet material, further comprising a linear or two-dimensional array of perforations or apertures cut into it at regular intervals or at predetermined locations. In the claims, a pegboard is called a "perforated plate" and a wire routing form sheet is called a "perforated flexible wire routing sheet."

Although in practice pegboards are available in 4 foot by 8 foot sheets, and 30 inch by 40 inch boards are common as fixtures for wire harness assembly work, in the illustrations of FIGS. 3a through 3h a small, 5 by 5 array is shown so that the components and operations may be seen more clearly.

In an embodiment shown in FIG. 3a, first, second, and third pegboards [141,] [142,] and [143] are arranged in a stack with their congruent aperture arrays aligned. A solid floor board not shown in this figure may reside below the third pegboard, or in an alternative embodiment the apertures of the third pegboard are blind apertures. Blind apertures may be created by affixing a blank or solid board to the third perforated plate. In another embodiment, a non-perforated sheet is affixed to the underside surface of the third pegboard. Apertures [145] in the first pegboard and apertures [146] in the second pegboard are larger than the second diameter of the beads of the floating pegs. The apertures [147] of the third pegboard are similar to and preferably a little larger than the first diameter of the floating pegs. However, in an alternative embodiment in accordance with the invention, the apertures in the second and third pegboards may be smaller than the bead diameter so that when dropped into place (as seen in FIG. 3c) the pegs will rest atop the second pegboards on their beads. This kind of embodiment may be acceptable if the beads do not interfere with the work of dressing the wires around the pegs.

A latch plate [132] is positioned between the first and second pegboards. The latch plate has an array of apertures which are similar in size to those of the first and second pegboards so that if aligned, the bead of a peg may pass through all three of these apertures. However, at this step the latch plate is positioned with its array of larger apertures displaced in a sliding direction and out of alignment with the pegboard aperture arrays.

Figure 3B:
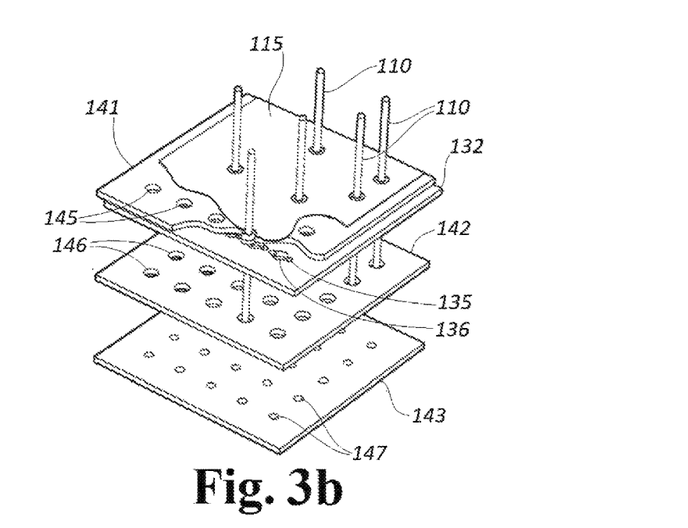
FIG. 3b shows a step of populating pegs according to a configuration of apertures in a wire routing form sheet.
Figure 3C:
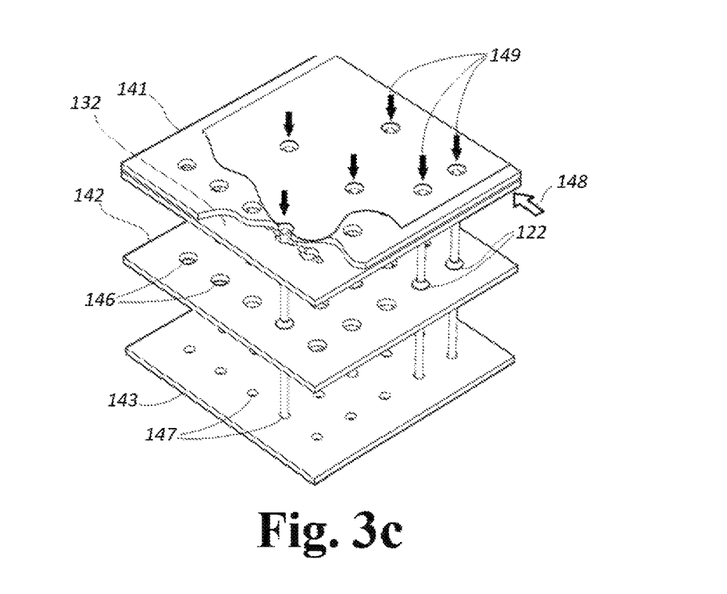
FIG. 3c shows the floating pins dropping into position as the latch plate slides from a peg locking to a peg release position.

FIG. 3b shows a step of populating the pegs [110] according to a configuration of apertures in a wire routing form sheet. After the steps of providing and aligning the pegboards and positioning the latch plate, a perforated wire routing form sheet [115] created for the specific wire harness product to be produced is lain atop the first pegboard [141.] When properly positioned, all the apertures on the form board align with apertures in the aligned pegboards. Apertures in the mylar sheet are also larger than the bead diameter of the pegs. In the next step, a peg is deposited in each of the holes in the mylar sheet. The slender section of the peg will pass through narrower portions [135] of the apertures in the latch plate [132] but the bead will not, so each peg rests upon the patch plate by its bead. The aperture arrays [145,] [146,] and [147] of the pegboards [141,] [142,] and [143] are congruent and when received into the frame they are aligned so that their aperture centers stack up to define vertical axes for receiving floating pegs to be deposited therein. In this step, the array of larger apertures [136] in the latch plate remain displaced along a sliding direction and remain out of alignment from the pegboard arrays.

FIG. 3c shows the floating pins dropping into position as the latch plate slides from a peg locking to a peg release position. At this step, the latch plate [132] is slid along a sliding direction illustrated by arrow [148.] The array of larger apertures of the latch plate now come into alignment with the pegboard apertures arrays and reside directly beneath the bead features of the pegs. Thus the latch plate may be used so that each floating pin may be individually locked in an extended position or a retracted position. Dropping motions of the released pegs are illustrated by the arrows [149.] The bead features drop through the first pegboard [141] so that the bottom tips of the pegs enter and seat into the aperture array [147] of the third pegboard [143.] The pegs may rest upon a floor beneath the third pegboard, or in the apertures of the third pegboard, according to an embodiment wherein these apertures [147] are blind apertures. The second pegboard [142] is positioned between the first and third pegboards so that its apertures [146] embrace the circumferences of the beads [122] of the pegs.

It is also hereby understood that it may be preferable that the pegboards are spaced apart at appropriate heights so that bead features of the pegs are located at a midpoint of the length of the pegs, and that the bead is axially symmetrical with regard to chamfers or other lead-in features, which in this specification means that the bead is located at a midpoint of the length of a peg, and the bead defines a central plane of symmetry from which both ends of the pegs extend equally, and the peg ends are also equally rounded. With such a peg, either tip may be inserted into the pegboard holes and the process would proceed to an equal outcome. Axially symmetric pegs eliminate the "wrong" tip from being inserted, that is, they eliminate a lost time event of a worker inserting a peg, realizing that the peg has been inserted the wrong way, and then having to pull out the peg, reverse it, and reinsert the peg.

Figure 3D:
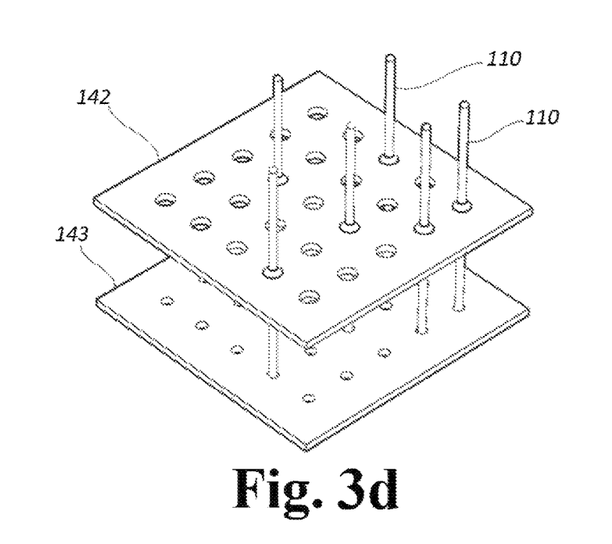
FIG. 3d shows an optional step of removing the first pegboard leaving pegs standing proud in the second pegboard.

FIG. 3d shows an optional step of removing the first pegboard so as to leave pegs [110] seated in the third pegboard [143] and standing proud in the second pegboard [142.] Also optionally, the wire routing form sheet may be placed onto the second pegboard so that graphics and indicia on the wire routing form sheet can guide the assembly work to be done. Alternatively, the form sheet may be positioned or suspended elsewhere in good view of the assembly workers if required.

Figure 3E:
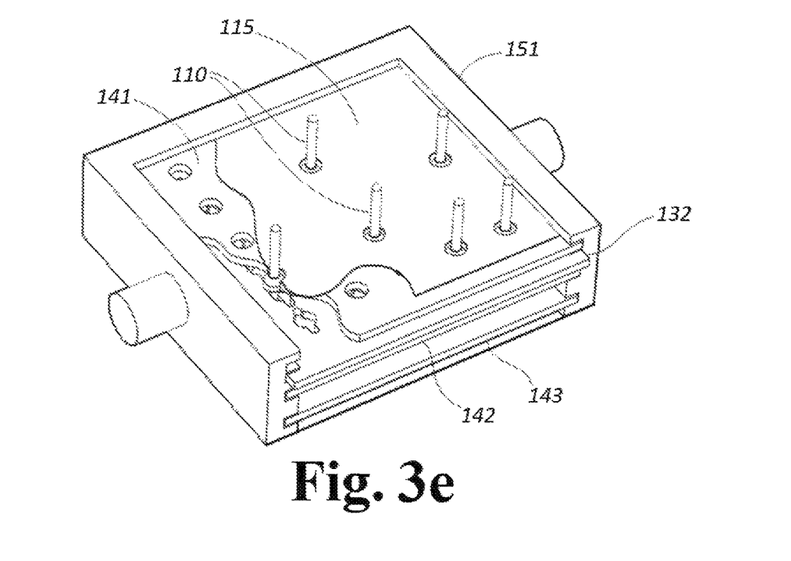
FIG. 3e shows an embodiment of the floating pin form board assembly having a frame with slots for pegboards and floating pin latch plate in accordance with the invention.

FIG. 3e shows an embodiment of the floating pin form board assembly having a frame [151] with dado grooves for receiving pegboards [141,] [142,] and [143,] and a floating pin latch plate [132] in accordance with the invention. As described previously, a wire routing form sheet [115] is lain atop the first perforated plate [141] and aligned so that its apertures align with apertures in the stacked pegboard arrays. Pegs [110] are then deposited into the aligned apertures. The latch plate as shown in this figure is in its displaced position so that the inserted pegs remain raised in the form board frame.

Figure 3F:
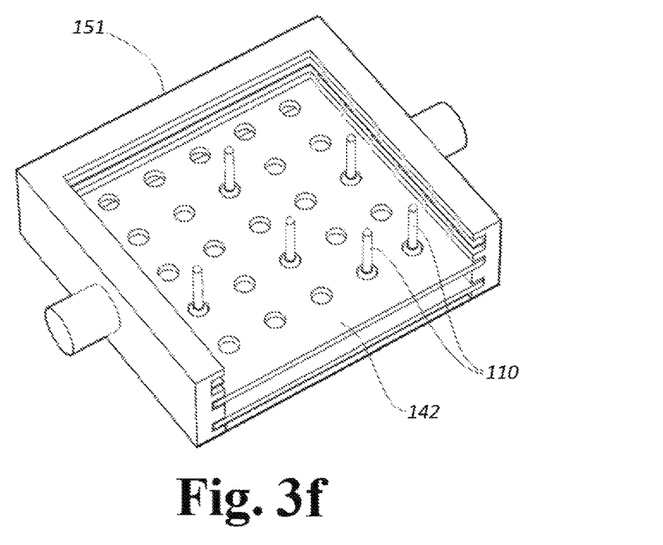
FIG. 3f shows the frame assembly of FIG. 3e with the wire routing form sheet and latch plate removed.

FIG. 3f shows the frame assembly [151] of FIG. 3e with the wire routing form sheet and latch plate removed. The second perforated plate [142] or pegboard is positioned so that its apertures embrace the circumferences of the bead of the pegs [110.] The assembly may be used in this configuration as a form board, and the wire routing form sheet may be optionally placed atop the second pegboard, especially if indicia, other graphics, or texts offer assembly instructions to which a worker may refer while assembling a wire harness.

Figure 3G:
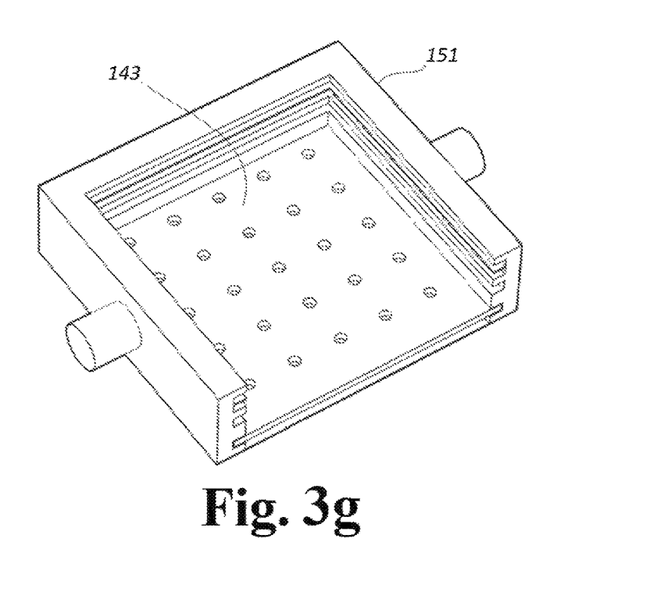
FIG. 3g shows the frame assembly with only the third pegboard in place and other components removed for clarity.

FIG. 3g shows the frame assembly [151] with only the third perforated plate or pegboard [143] in place and other components removed for clarity. The slender tips of floating pegs may pass through the apertures of the plate and rest on the floor of the frame, or alternatively, the third pegboard may comprise an array of blind apertures or countersunk or counterbored apertures or the like to receive the peg tips.

Figure 3H:
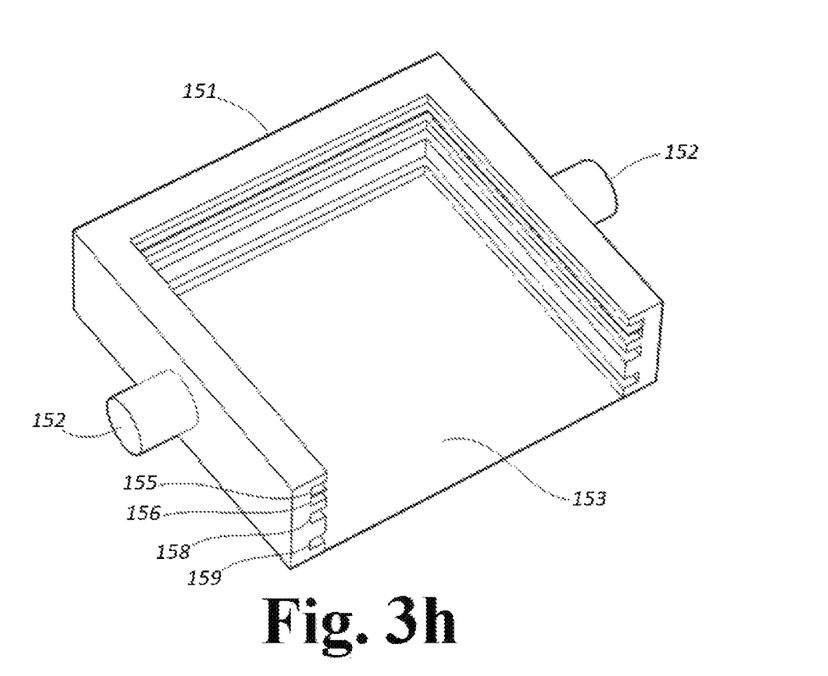
FIG. 3h shows the frame assembly with all other components removed.

FIG. 3h shows the frame assembly [151] with all other components removed. The frame assembly includes a pair of coaxially located trunnions [152] so that the frame may be rotatably coupled to a work bench by these trunnions, and so that when a particular production run using one configuration of pegs is complete and it is desired to configure the floating peg form board for a different production run, the frame assembly may be flipped over so that the pegs fall out into a collection box or the like. This figure also shows the floor [153] of the frame assembly, and a set of dados which receive the perforated plates and the latch plate. In this figure, dado [155] receives the first perforated plate, dado [156] receives the latch plate, dado [158] receives the second perforated plate, and dado [159] receives the third perforated plate. Of the second and third perforated plates, either or both may be permanently mounted to the frame [151.] According to another alternative embodiment, dadoes [155] and [156] may be combined into a single dado groove wide enough to accommodate the first perforated plate and an underlying latch plate as a single sandwich.

According to another embodiment of a frame assembly in accordance with the invention, by rotating this floating pin board assembly 180 degrees (i.e, tipping it over by its trunnions) with the pre-punched wire routing form sheet in place, the floating pins protrude through the wire routing form sheet holes and may be locked into an extended position by sliding the latch plate in its sliding direction. Once the assembly form board is rotated back 180 degrees, an operator has available a wire harness pin board ready for use to assemble and route wires to specific dimensional requirements.

A form board assembly system using locked-in floating pins and pre-fabricated wire routing form sheets with defined pinhole locations is a feature of benefit to a cable or wire harness assembly work center invention that eliminates excess storage space typically required for wire harness plywood form boards. As mentioned elsewhere, in comparison to the space required to store numerous plywood form board products, pre-punched wire routing form sheets in accordance with the invention may be stored in conventional file drawer cabinetry, and on a basis of unit volume of storage cabinetry or shelving, many times more product designs may be stored as stacks of membranes in comparatively flat drawers than may be stored as stacks of rigid boards having mounted pegs, or than may be stored as stacks of perforated boards of any substantial thickness.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems. Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise.

Consequently and in summary, although many exemplary embodiments are described above, it will be appreciated that the invention is intended to cover all modifications and equivalents within the scope of the following claims.

What is claimed is:

1. A wire routing form sheet assembly aid, comprising:
a work block comprising an array chambers each having a first through-diameter and a counterbore of a second diameter larger than said first through-diameter, said counterbore further comprising an end surface,
a plurality of extendable and retractable pegs, each of said pegs having a shaft portion of a first diameter smaller than said first through-diameter of said chambers of said work block, and a stop feature having a diametral extent larger than said first through-diameter of said chambers of said wire routing form sheet work block, said stop feature also receivable within said counterbore,
said plurality of pegs disposed within said array of chambers, and
peg lifting means, with any one of said plurality of pegs defining an extended position whereby said stop feature contacts said end surface of said counterbore of the chamber within which it is disposed.

2. The wire routing form sheet assembly aid of claim 1, wherein said peg lifting means comprises any one of the set of means consisting of: a spring, pneumatic pressure, a magnet, and a solenoid.

3. The wire routing form sheet assembly aid of claim 1, wherein said work block has a thickness at least equal to an excursion distance of said pegs.

4. The wire routing form sheet assembly aid of claim 1, wherein any one of said pegs further comprises a stop feature which is a bead located at a midpoint along a length of said peg, said bead defining a central plane of symmetry from which both ends of said peg extend equally, and said peg ends are rounded.

5. The wire routing form sheet assembly aid of claim 1, further comprising a slidable latch plate having an array of keyhole slots complementary to said array of chambers in said work block, wherein each keyhole slot is an aperture having a perimeter comprising
an arcuate portion of a first diameter slightly larger than said first diameter of any one peg, and
an arcuate portion of a second diameter larger than said diametral extent of said stop feature of said any one peg.

6. The wire routing form sheet assembly aid of claim 1, further comprising a slidable latch plate having a slot traversing at least two chambers.

7. The wire routing form sheet assembly aid of claim 1, wherein any one peg further comprises a turned groove, and its stop feature is selected from the set of stop feature consisting of: a snap ring, a flange, and a transverse pin.

8. A floating peg form board assembly comprising:
a perforated wire routing form sheet,
first, second, plates third plates each having apertures spaced apart in congruent arrays, with said first and said second plate being perforated plates,
a plurality of floating pegs, with each of said pegs comprising a shaft portion of a first diameter and a stop feature having a diametral extent larger than said first diameter of said peg, and
a slidable latch plate having an array of keyhole slots complementary to any one array of apertures in any one of said perforated plates, wherein each keyhole slot is an aperture having a perimeter comprising
an arcuate portion of a first diameter slightly larger than said first diameter of any one peg, and
an arcuate portion of a second diameter larger than said diametral extent of said stop feature of said any one peg, and
wherein apertures in said first, second, and third perforated plates are larger than said first diameter of said first diameter of any one peg.

9. The floating peg form board assembly of claim 8, further comprising a frame for receiving said first, second, and third plates and said latch plate and wherein said frame aligns said said first, second, and third plates so that their aperture centers define vertical axes for receiving floating pegs deposited therein.

10. The floating peg form board assembly of claim 9, wherein said second and third plates are permanently mounted into said frame.

11. The floating peg form board assembly of claim 9, wherein said frame further comprises a dado for receiving up to any two of said first, second and third perforated plates.

12. The floating peg form board assembly of claim 9, wherein said frame further comprises a pair of coaxially located trunnions.

13. The floating peg form board assembly of claim 8, wherein any one peg further comprises a turned groove and its stop feature is selected from the set of stop feature consisting of: a snap ring, a flange, and a transverse pin.

14. The floating peg form board assembly of claim 8, wherein said perforated wire routing form sheet is a perforated flexible wire routing membrane comprises a material selected from the set of materials consisting of: Masonite, wood, biaxially-oriented polyethylene terephthalate, acrylonitrile butadiene styrene, polyethylene, aluminum, steel, polystyrene, and polyamide.

15. The floating peg form board assembly of claim 8, wherein said third plate is a perforated plate, and further comprising a solid board affixed to said third plate.

16. The floating peg form board assembly of claim 8, wherein said apertures of said third plate are blind apertures.

17. The floating peg form board assembly of claim 8, wherein said apertures in said first perforated plate are larger than said first diameter of said diametral extent of said any one peg.

18. The floating peg form board assembly of claim 8, wherein said apertures in said second perforated plate are larger than said first diameter of said diametral extent of said any one peg.

19. The floating peg form board assembly of claim 8, wherein said latch plate is disposed between said first and second perforated plates.

20. The floating peg form board assembly of claim 8, wherein said latch plate is disposed between said second and third perforated plates.

* * * * *